(No Model.)
E. GRENET.
WHEEL TIRE.
No. 516,201. Patented Mar. 13, 1894.
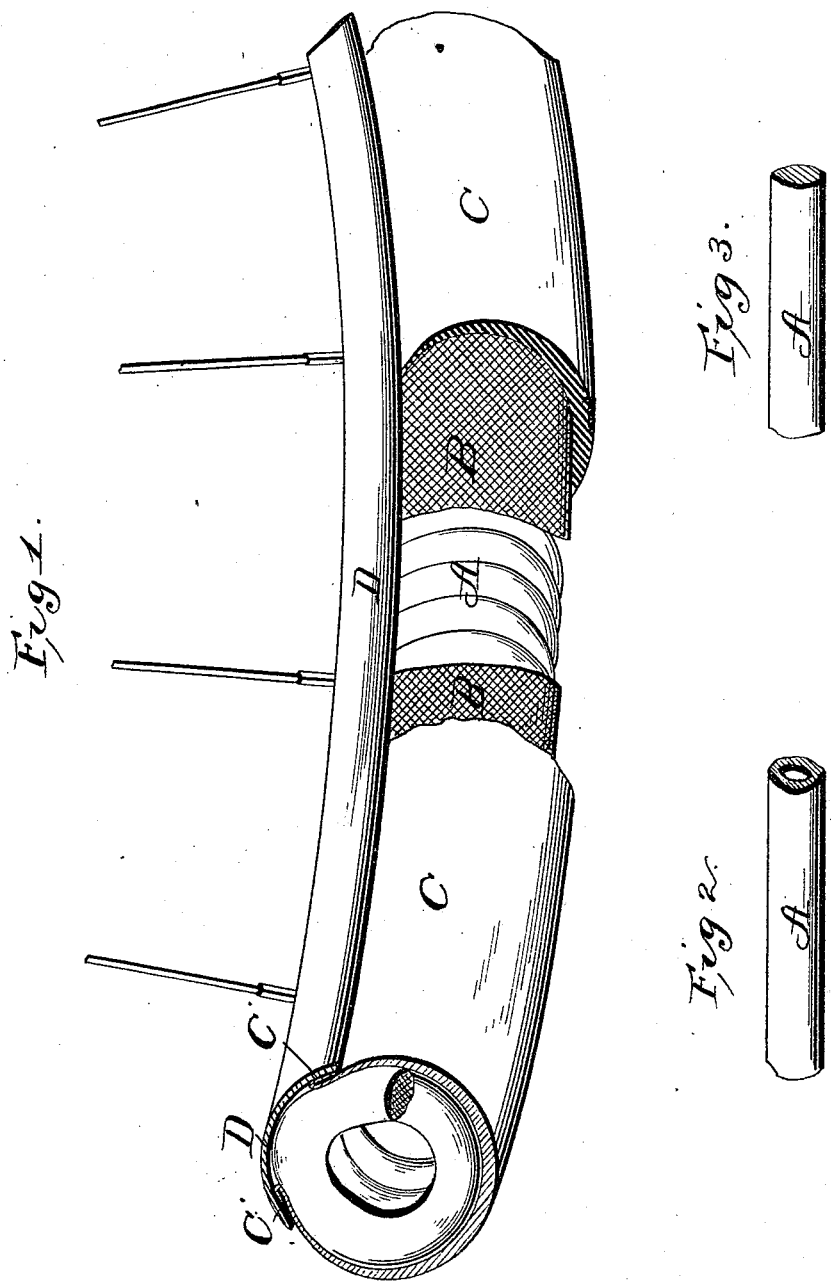
Attest
Wm. T. Hall.
F. L. Middleton
Inventor
Emile Grenet
by Richards & Co.
Attys

UNITED STATES PATENT OFFICE.

EMILE GRENET, OF PARIS, FRANCE.

WHEEL-TIRE.

SPECIFICATION forming part of Letters Patent No. 516,201, dated March 13, 1894.

Application filed July 7, 1893. Serial No. 479,860. (No model.)

*To all whom it may concern:*

Be it known that I, EMILE GRENET, a citizen of the Republic of France, and a resident of Paris, France, have invented a certain new and useful Improvement in Wheel-Tires, of which the following is a specification.

Of all systems of tires of the wheels of velocipedes, it cannot be disputed that the pneumatic tire has had the greatest success. The rider finds therein the required elasticity and consequently he can make his rides without getting so tired. Still the pneumatic tire has a great defect in that it bursts easily, after which of course it collapses and must be repaired or replaced before further use. The desideratum so much looked for is therefore to create a tire possessing all the elasticity of pneumatic tires without being liable to burst. That is the subject matter of the present invention.

In the annexed drawings Figure 1 shows a segment of the rim and tire and Figs. 3 and 4 show the details of the new tire. The interior is hollow like that of the pneumatic and around the interior space a coil A of caoutchouc hollow (Fig. 2) or solid (Fig. 3) is wound spirally, with a small pitch so that the neighboring coils touch each other. The winding is made around a mold of a caliber corresponding to the diameter of the hollow interior. After having reached the desired length, the winding is stopped and the spiral A is enveloped by a piece of canvas coated with caoutchouc or by whatsoever other appropriate material B which is drawn very tight around it. The mold is then taken out and there remains a tube formed by the coil of caoutchouc, hollow or solid, forming a spiral and enveloped by a canvas coated with caoutchouc. The relative freedom of the coils between themselves, allows a slight sliding and renders the tube much more elastic than a tube made of one piece. Besides this, each turn of the coil protrudes slightly beyond the point of contact with its neighbor and is separated from the next by a small space. The consequence of this is that the tire has a good hold upon the ground and slipping is much less likely than with smooth tires.

The exterior of the tube is covered by an envelope of caoutchouc $c$ of which the tread is the heaviest. The entire length of the borders of the said envelope is wound around metallic wires $c'$, $c'$ which being pressed between the rim D of the machine and the tube, hold the caoutchouc envelope $c$ in its place. The coil forming the spiral can have any section and be of any thickness. Instead of two envelopes (one of canvas and one of caoutchouc) it is also possible to use only one either that of canvas or that of caoutchouc.

The fixing of the parts together can be done in various ways.

What I claim is—

A tire consisting of an outer casing of flexible material and a continuous coil of rubber spirally arranged within the casing, substantially as described.

In testimony that I claim the foregoing as my invention I have signed my name, in presence of two witnesses, this 5th day of June, 1893.

EMILE GRENET.

Witnesses:
 MAURICE CORROYER,
 R. M. HOOPER.